United States Patent
Kwon

(10) Patent No.: US 7,349,937 B2
(45) Date of Patent: Mar. 25, 2008

(54) FAST INCREMENTER USING ZERO DETECTION AND INCREMENT METHOD THEREOF

(75) Inventor: Yo-Han Kwon, Gunpo (KR)

(73) Assignee: Samsung Electronics Co., Ltd., Kyunggi-do (KR)

( * ) Notice: Subject to any disclaimer, the term of this patent is extended or adjusted under 35 U.S.C. 154(b) by 681 days.

(21) Appl. No.: 10/695,820

(22) Filed: Oct. 30, 2003

(65) Prior Publication Data

US 2004/0158599 A1 Aug. 12, 2004

(30) Foreign Application Priority Data

Feb. 6, 2003 (KR) ............... 10-2003-0007415

(51) Int. Cl.
*G06F 7/50* (2006.01)

(52) U.S. Cl. ........................................... 708/672

(58) Field of Classification Search ................ 708/672
See application file for complete search history.

(56) References Cited

U.S. PATENT DOCUMENTS

| 5,635,858 | A | 6/1997 | Chang et al. | |
|---|---|---|---|---|
| 6,665,698 | B1* | 12/2003 | Tsai et al. ................ | 708/672 |
| 6,678,711 | B1* | 1/2004 | Kalari ..................... | 708/672 |
| 2003/0097392 | A1* | 5/2003 | Masteller ................. | 708/672 |
| 2004/0015534 | A1* | 1/2004 | Motoyama et al. ......... | 708/672 |

\* cited by examiner

*Primary Examiner*—D. H. Malzahn
(74) *Attorney, Agent, or Firm*—Harness, Dickey & Pierce, P.L.C.

(57) ABSTRACT

A fast incrementer using zero detection and an increment method thereof. The incrementer performs a logic combination on an operand, first logic state inclusion information for each b-bit group of the operand, flag information for each b-bit group of the operand, and an increment value, and outputs a whole increment value for the operand.

28 Claims, 6 Drawing Sheets

US 7,349,937 B2

FAST INCREMENTER USING ZERO DETECTION AND INCREMENT METHOD THEREOF

BACKGROUND OF THE INVENTION

This application claims priority from Korean Patent Application No. 10-2003-7415, filed on 6 Feb. 2003, the entire contents of which are hereby incorporated by reference.

Field of the Invention

The present invention relates to a calculator of a microprocessor, and more particularly, to an incrementer.

Description of the Related Art

An incrementer is an adder or a counter for adding a binary "1" to an input operand. In a microprocessor, an incrementer performs various operations including calculation of 2's complements of Boolean logic or addition of a binary "1" to an input operand.

A conventional incrementer using a full adder has low operating speed because it must wait for transmission of a carry bit. Also, since the conventional incrementer includes a circuit for processing the carry bit, it occupies a large area of a microprocessor chip.

A zero-stopping incrementer, using many static logic gates, is discussed in U.S. Pat. No. 5,635,858. The zero-stopping incrementer determines whether the input operand is an even number or odd number. If the input operand is an even number, the zero-stopping incrementer changes a least significant bit (LSB) to a binary "1". For an odd number, the zero-stopping incrementer searches for the first binary "0" beginning with the LSB, changes that binary "0" to a binary "1" and all preceding binary "1s" into binary "0s". However, the zero-stopping incrementer occupies a large area of the microprocessor chip due to use of many static logic gates.

SUMMARY OF THE INVENTION

An exemplary embodiment of the present invention provides a fast incrementer having a simple circuit for zero detection and a simple circuit with a MUX structure, which is capable of performing speedy calculation and occupies a small area of a microprocessor chip.

An exemplary embodiment of the present invention also provides an increment method of the fast incrementer.

Another exemplary embodiment of the present invention, provides an incrementer comprising a b-bit zero detection unit, a flag information generation unit, a b-bit increment unit, and an increment output unit. In one exemplary embodiment of the present invention and in the following examples, b=4.

In an exemplary embodiment a 4-bit zero detection unit groups every 4 bits of an operand, starting from the least significant bit, determining whether each 4-bit group includes a first logic state, and outputs a second logic state as first logic state inclusion information for each 4-bit group if the 4-bit group includes the first logic state. Alternatively the zero detection unit outputs the first logic state as first logic state inclusion information for each 4-bit group if the 4-bit group does not include the first logic state. The flag information generation unit outputs flag information for each 4-bit group by generating the first logic state for the first group with the second logic state, starting from the LSB of the first logic state inclusion information for each 4-bit group, and for the following lower order groups, and generating the second logic state for higher order groups preceding the first group with the second logic state. The 4-bit increment unit receives the operand and performs an increment on each 4-bit group. The increment output unit performs a logical combination on the operand, the first logic state inclusion information for each 4-bit group, the flag information for each 4-bit group, and the increment value for each 4-bit group. The increment output unit generates a whole increment value by outputting 4 bits of the first logic state for each 4-bit group, 4 bits of the operand for each 4-bit group, or 4 bits of the increment value for each 4-bit group.

In an exemplary embodiment, the increment is performed in accordance with the following Boolean logic expressions:

IF IN<0> and IN<1>="1", (IN+1)<3:2>=IN$_C$<3:2>, (IN+1)<1:0>="00",

IF IN<0> or IN<1>="0", (IN+1)<3:2>=IN<3:2>, (IN+1)<1:0>=IN$_C$<1:0>, where IN represents the operand, IN+1 represents the increment value, IN$_C$ represents a newly defined increment value, "0" represents the first logic state, and "1" represents the second logic state (Boolean expression 1), and

IN$_C$<0>=~IN<0>,

IN$_C$<1>=IN<0> OR IN<1>,

IN$_C$<2>=~IN<2>,

IN$_C$<3>=IN<2> OR IN<3>, where IN represents the operand and IN$_C$ represents a newly defined increment value (Boolean expression 2). The tilde symbol "~" represents the logical compliment and the "OR" symbol represents exclusive-or.

In an exemplary embodiment, the logical combination is performed in accordance with the following Boolean logic expression:

IF ZD="0" and CA="0", IO="0000",

IF ZD="1" and CA="0", IO=IN+1,

IF CA="1" where ZD is any value, IO=IN, where ZD represents the first logic state inclusion information for each 4-bit group, CA represents the flag information for each 4-bit group, IO represents the whole increment value for each 4-bit group, IN represents the operand, IN+1 represents the increment value, "0" represents the first logic sate, and "1" represents the second logic state (Boolean expression 3).

In an exemplary embodiment the incrementer operates when the 4-bit zero detection unit, the flag information generation unit, the 4-bit increment unit, and the increment output unit are activated in response to a clock signal. When the clock signal is inactivated, respective input nodes of the output buffers of the 4-bit zero detection unit, the flag information generation unit, the 4-bit increment unit, and the increment output unit are precharged to a precharging voltage. An inverter for inverting the precharging voltage and a PMOSFET for supplying the precharging voltage to the input end of the inverter in response to the output of the inverter are used as the output buffers. The output of the inverter is inverted to the second logic state when the clock signal is activated and a plurality of NMOSFETs, connected in series between the input nodes of the output buffers and a ground voltage, are activated.

Another exemplary embodiment of the present invention, there is provided an increment method of an incrementer. The increment method comprises grouping every 4 bits of an operand starting from the least significant bit, determining whether a first logic state is included in each 4-bit group, and outputting first logic state inclusion information for each 4-bit group as a second logic state if the first logic state is included and as the first logic state if the first logic state is not included. The increment method, outputs flag information for each 4-bit group by generating the first logic state for the first group with the second logic state, starting from the LSB of the first logic state inclusion information for each 4-bit group, and for the following lower order groups, and generating the second logic state for higher order groups preceding the first group with the second logic state. The increment method receives the operand and performs an increment on each 4-bit group, and performs a logical combination on the operand, the first logic state inclusion information for each 4-bit group, the flag information for each 4-bit group, and the increment value for each 4-bit group, and generates a whole increment value by outputting 4 bits of the first logic state for each 4-bit group, 4 bits of the operand for each 4-bit group, or 4 bits of the increment value for each 4-bit group.

BRIEF DESCRIPTION OF THE DRAWINGS

The above features of embodiments of the present invention will become more apparent from the detailed description and accompanying drawings, wherein.

DETAILED DESCRIPTION OF EXEMPLARY EMBODIMENTS OF THE INVENTION

The following description of the exemplary embodiment (s) is merely exemplary in nature and is in no way intended to limit the invention, its application, or uses.

An exemplary embodiment of present invention will now be described more fully with reference to the accompanying drawings, in which an exemplary embodiment of the present invention is shown.

Figure 1:
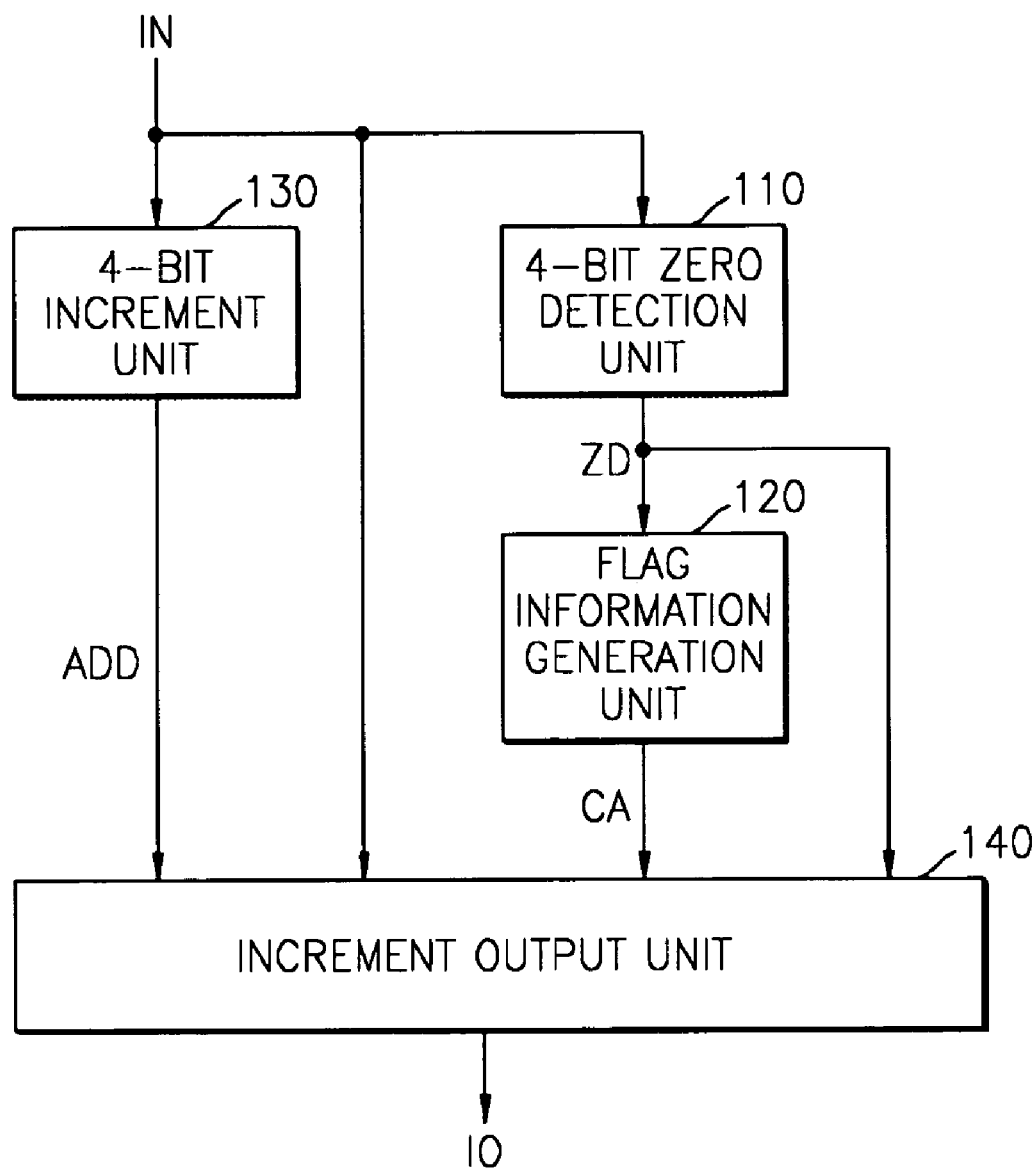
FIG. 1 a block diagram of an incrementer according to an exemplary embodiment of the present invention.

FIG. 1 a block diagram of an incrementer according to an exemplary embodiment of the present invention, where b-bit is 4-bit.

Referring to FIG. 1, the incrementer includes a 4-bit zero detection unit 110, a flag information generation unit 120, a 4-bit increment unit 130, and an increment output unit 140.

The 4-bit zero detection unit 110 groups every 4-bits of an input operand IN, starting from the least significant bit (LSB), and determines whether each 4-bit group includes a logic "0", i.e., a first logic state (logic low). If a 4-bit group includes the first logic state, the 4-bit zero detection unit 110 generates a logic "1", i.e., a second logic state (logic high) first logic state inclusion information ZD for 4-bit group. If a 4-bit group does not include the first logic state, the 4-bit zero detection unit 110 outputs the first logic state as first logic state inclusion information ZD for each 4-bit group.

The operand IN is generally composed of 32 bits or 64 bits in microprocessor calculations, but may be composed of any number of $2^N$ bits where N is zero or a positive integer. The incrementer according to exemplary embodiments of the present invention can process any number of bits. However for the following examples, the operand IN is assumed to be composed of 32 bits.

If the 32-bit operand IN is divided into eight 4-bit groups, the first logic state inclusion information ZD for each 4-bit group, output from the 4-bit zero detection unit 110, is composed of 1 bit, and thus, a total of 8 bits of first logic state inclusion information ZD is generated. For a 4-bit group with a logic "0", the first logic state inclusion information ZD is output as a logic "1". For a 4-bit group with only logic "1s", the first logic state inclusion information ZD is output as a logic "0". In other embodiments of the present invention, the operand IN can be divided into different b-bit groups. For example, if the operand IN is divided into six 6-bit groups, the first logic state inclusion information ZD can be 1 bit and, thus, a total of 6 bits of first logic state inclusion information ZD is generated. Other embodiments in accordance with the present invention can used various bit sizes for the operand IN and the first logic state inclusion information ZD.

In Example 1, in an exemplary embodiment of the present invention, when the 4-bit zero detection unit 110 groups every 4-bits of the operand IN, starting from the least significant bit (LSB), 4-bit groups with ZD<6> or ZD<3> have a logic "0". Thus, ZD<6> and ZD<3> are output as logic "1s", and other first logic state inclusion information ZD, i.e., ZD<7>, ZD<5>, ZD<4>, ZD<2>, ZD<1>, and ZD<0>, are output as logic "0s".

EXAMPLE 1

Operand: 1111 0000 1111 1111 1011 1111 1111 1111
Whole Increment value: 1111 0000 1111 1111 1100 0000 0000 0000
CA<7:1>: CA<7> CA<6> CA<5> CA<4> CA<3> CA<2> CA<1>
ZD<7:0>: ZD<7> ZD<6> ZD<5> ZD<4> ZD<3> ZD<2> ZD<1> ZD<0>

The flag information generation unit 120 outputs flag information CA for each 4-bit group by generating the first logic state for the first group with the first logic state, starting from the LSB of the first logic state inclusion information ZD for each 4-bit group, and for the following lower order groups, and generating the second logic state for higher order groups preceding the first group with the first logic state.

If the 32-bit operand IN is divided into eight 4-bit groups, the flag information CA for each 4-bit group is composed of 1 bit, and thus, a total of 8 bits of flag information CA is generated. The flag information CA is composed of the first logic state or the second logic state. The flag information CA of the first group, having the second logic state as the first logic state inclusion information ZD, starting from the LSB, i.e., the 4-bit group with ZD<3>, and the flag information CA values of the lower order 4-bit groups following the 4-bit group with ZD<3>, are logic "0s". The flag information CA values of the higher order 4-bit groups preceding the 4-bit group with ZD<3> are logic "1s". Particularly, CA<0> is not needed because CA<0> is a logic "0" at all times. Although the examples discussed use a 32-bit operand IN, the scope of the present invention is not limited to a particular size of the operand IN.

In Example 1, in an exemplary embodiment of the present invention, the 4-bit group with ZD<6> or ZD<3> has a logic "0", and thus, ZD<6> and ZD<3> are logic "1s". Therefore, the flag information CA for the 4-bit group with ZD<3> and the lower order 4-bit groups following the 4-bit group with ZD<3> are output as logic "0s". Also, the flag information CA for the higher order 4-bit groups preceding the 4-bit group with ZD<3> are output as logic "1s". In other words, CA<3>, CA<2>, and CA<1> are logic "0s", and CA<7>, CA<6>, CA<5>, and CA<4> are logic "1s".

The 4-bit increment unit 130 receives the operand IN, performs an increment on each 4-bit group, and outputs an increment value ADD for each 4-bit group to the increment output unit 140.

The increment value ADD is output in accordance with the following Boolean logic expressions:

IF IN<0> and IN<1>="1", (IN+1)<3:2>=IN$_C$<3:2>, (IN+1)<1:0>="00",

IF IN<0> or IN<1>="0", (IN+1)<3:2>=IN<3:2>, (IN+1)<1:0>=IN$_C$<1:0>,   (1), where IN represents the operand, IN+1 represents the increment value ADD, IN$_C$ represents a newly defined increment value, "0" represents the first logic state, and "1" represents the second logic state, and

IN$_C$<0>=~IN<0>,

IN$_C$<1>=IN<0> OR IN<1>,

IN$_C$<2>=~IN$_C$<2>,

IN$_C$<3>=IN<2> OR IN<3>,   (2), where IN represents the operand, IN$_C$ represents a newly defined increment value (Boolean expression 2). The tilde symbol "~" represents the logical compliment and the "OR" symbol represents exclusive-or.

The increment output unit 140 performs a logic combination on the operand IN, the first logic state inclusion information ZD for each 4-bit group, the flag information CA for each 4-bit group, and the increment value ADD for each 4-bit group, and outputs a whole increment value IO composed of 4-bits of the first logic state for each 4-bit group, the 4-bit operand IN for each 4-bit group, or the 4-bit increment value ADD for each 4-bit group.

The logic combination is performed in accordance with the following Boolean logic expression.

IF ZD="0" and CA="0", IO="0000",

IF ZD="1" and CA="0", IO=IN+1,

IF CA="1" where ZD is any value, IO=IN   (3), where ZD represents the first logic state inclusion information ZD for each 4-bit group, CA represents the flag information for each 4-bit group, IO represents the whole increment value for each 4-bit group, IN represents the operand, IN+1 represents the increment value ADD, "0" represents the first logic sate, and "1" represents the second logic state.

Back to Example 1, the 4-bit group with ZD<3> is increased by 1, and thus, the whole increment value IO is generated as "1111 0000 1111 1111 1100 0000 0000 0000". In an exemplary embodiment of the present invention the incrementer according to the present invention has been shown to operate at 200 pico/sec or less. In this embodiment, the operational frequency of an entire system is expected to be 10 GHz or more.

Hereinafter, the, operation of the incrementer with respect to an exemplary embodiment of the present invention will be described in detail with reference to FIGS. 2 through 5.

Figure 2:
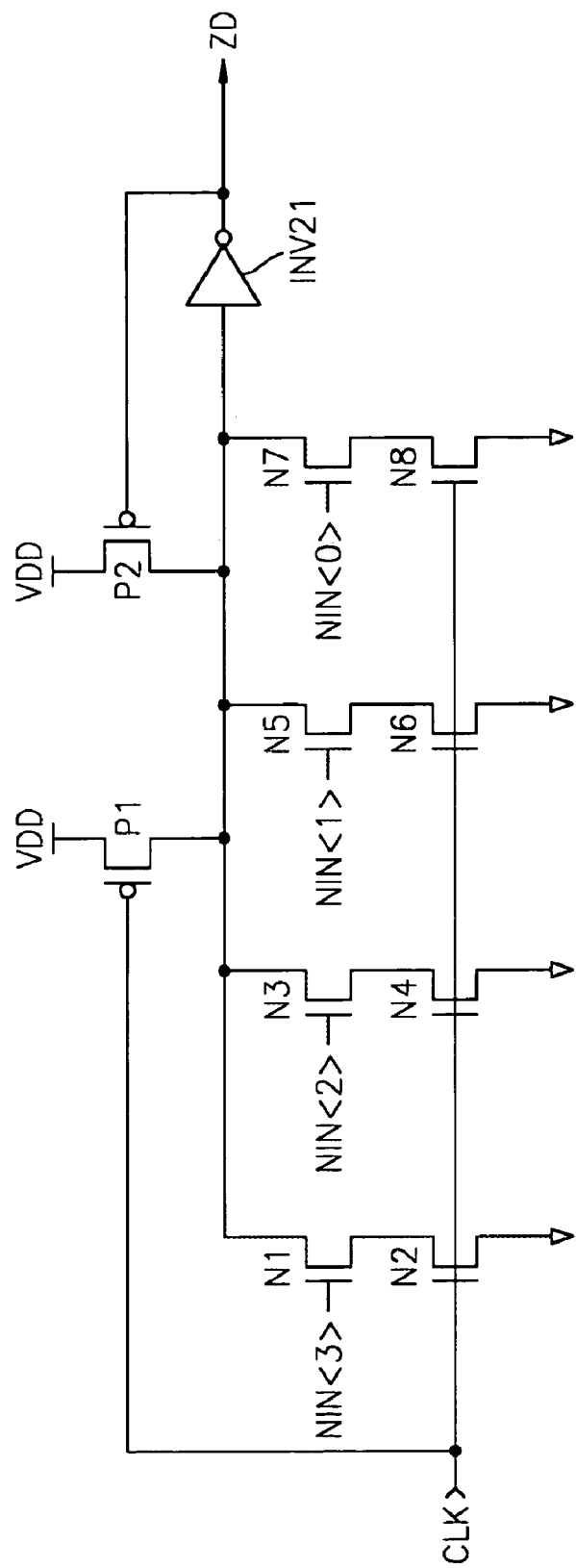
FIG. 2 is a detailed circuit diagram of a 4-bit zero detection unit of FIG. 1 in an exemplary embodiment of the present invention.

FIG. 2 is a detailed circuit diagram of the 4-bit zero detection unit 110 of FIG. 1 in an exemplary embodiment of the present invention.

Referring to FIG. 2, when a clock signal CLK is inactivated, i.e., the first logic state, a PMOSFET P2 and an input end of an inverter INV21 are precharged to a precharging voltage VDD by a PMOSFET P1. The inverter INV21 and the PMOSFET P2 function as output buffers. The inverter INV21 inverts the precharging voltage VDD, and the PMOSFET P2 supplies the precharging voltage VDD to an input end of the inverter INV21 in response to the output of the inverter INV21. When the clock signal CLK is activated, i.e., the second logic state, and all pairs of NMOSFETs, e.g., N1 and N2, and N3 and N4, etc., connected in series between the PMOSFET P2 (and the input end of the inverter INV21) and a ground voltage, are activated, the output of the inverter INV21 is converted into the second logic state. NIN<0> through NIN<3> are 4-bit inverted signals, belonging to a 4-bit group among eight 4-bit groups constituting the 32-bit operand IN. Each 4-bit group needs the 4-bit zero detection unit 110 of FIG. 2. In alternative embodiments of the present invention, operand IN can be of various bit sizes, and the group size can vary in relation to operand IN.

The 4-bit zero detection unit 110 of FIG. 2 groups every 4 bits of the operand IN, starting from the LSB and determines whether each 4-bit group includes a logic "0", i.e., the first logic state (logic low). If a 4-bit group includes the first logic state, the 4-bit zero detection unit 110 outputs a logic "1", i.e., the second logic state (logic high), as the first logic state inclusion information ZD for each 4-bit group. If a 4-bit group does not include the first logic state, the 4-bit zero detection unit 110 outputs the first logic state as the first logic state inclusion information ZD for each 4-bit group.

Figure 3A:
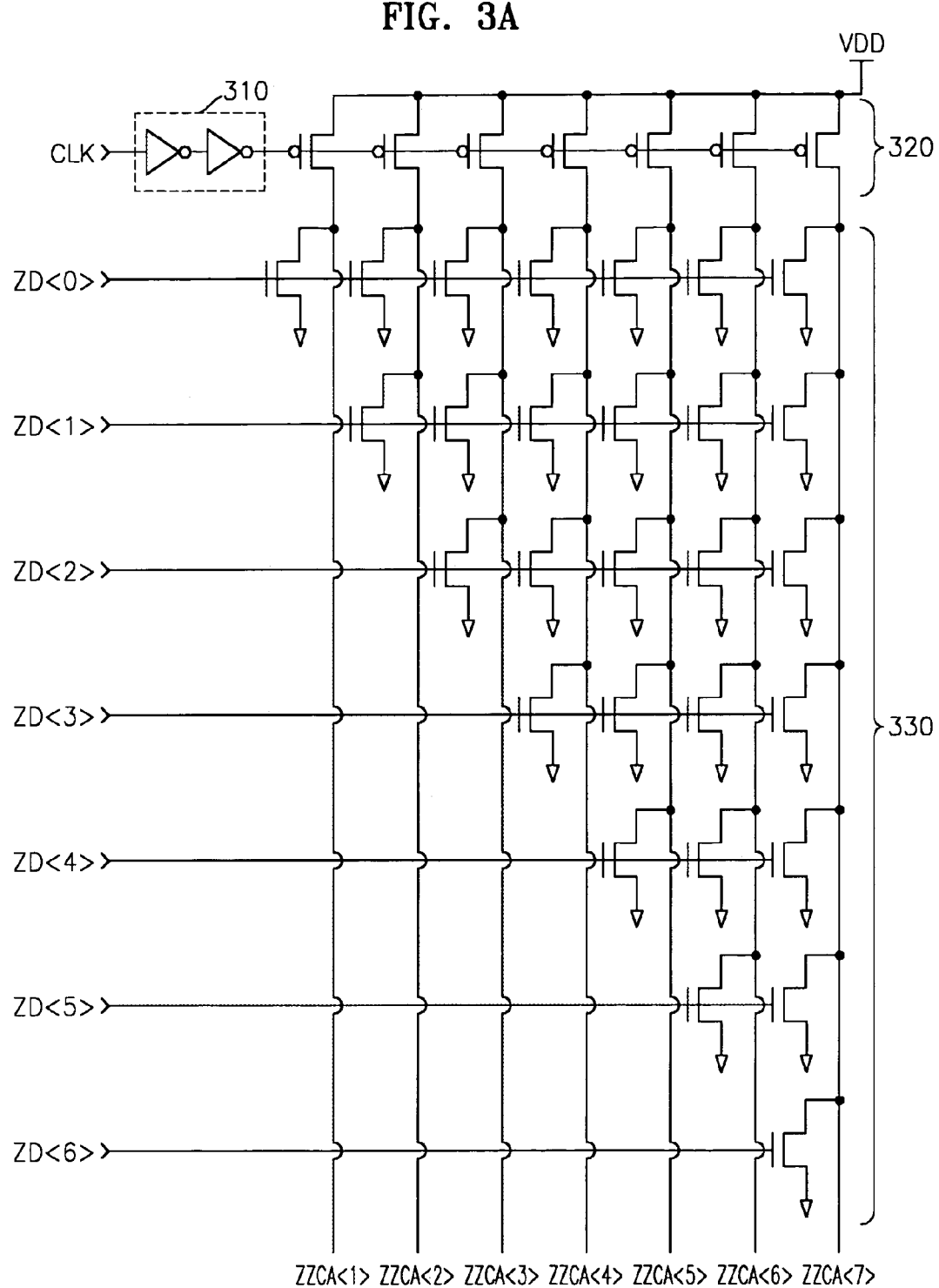
FIGS. 3A and 3B are detailed circuit diagrams of a flag information generation unit of FIG. 1 in an exemplary embodiment of the present invention.
Figure 3B:
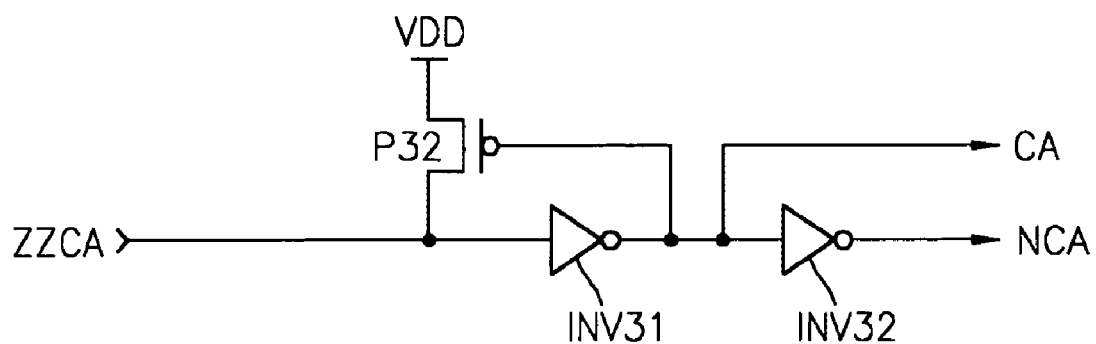

FIGS. 3A and 3B are detailed circuit diagrams of the flag information generation unit 120 of FIG. 1 in an exemplary embodiment of the present invention.

Referring to FIGS. 3A and 3B, a PMOSFET P32 and an input end of an inverter INV31, i.e., a node ZZCA, are precharged to the precharging voltage VDD by a circuit 320 when the clock signal CLK input through a clock buffer 310 is inactivated, i.e., the first logic state. The inverter INV31 and the PMOSFET P32 function as output buffers. The inverter INV31 inverts the precharging voltage VDD. The PMOSFET P32 supplies the precharging voltage VDD to the input end of the inverter INV31, i.e., the node ZZCA, in response to the output of the inverter INV31. The output of the inverter INV31 is converted into the second logic state when the clock signal is activated, i.e., the second logic state, and a plurality of NMOSFETs 330, connected in series between the PMOSFET P32 (and the input end of the inverter INV31), i.e., the node ZZCA, and a ground voltage, are activated. ZD<0> through ZD<6> represent the first logic state inclusion information ZD for each 4-bit group.

Figure 5:
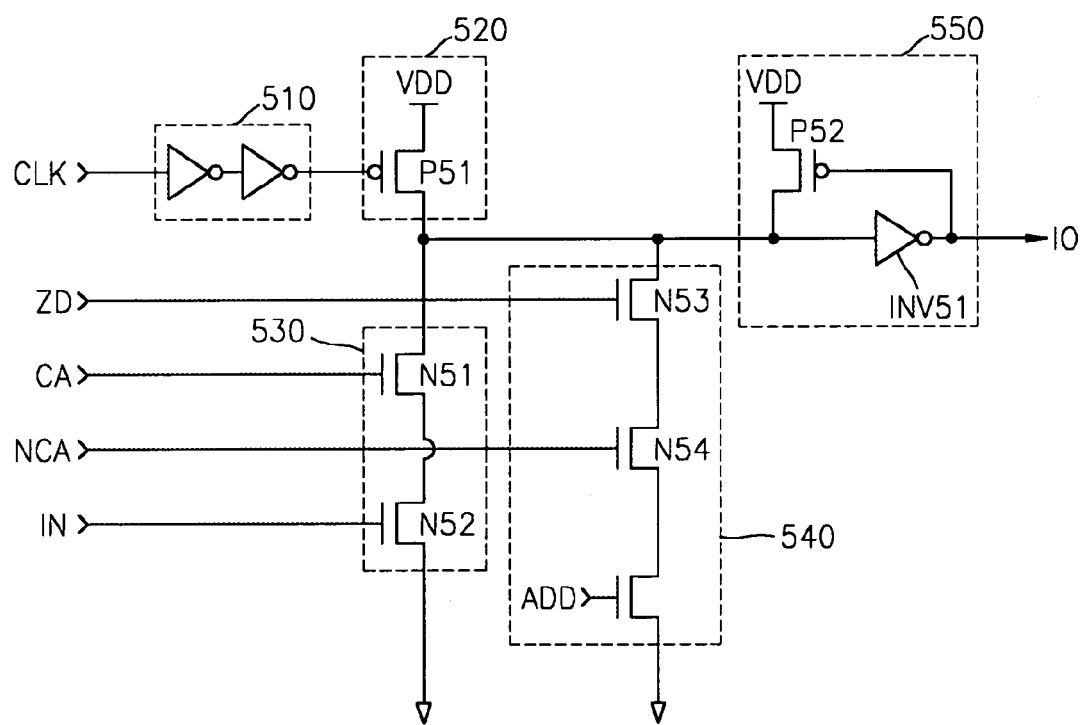
FIG. 5 is a detailed circuit diagram of an increment output unit of FIG. 1 in an exemplary embodiment of the present invention.

Since the flag information CA<7> is a logic "0" if the first 4-bit group starting from the most significant bit (MSB) has a logic "0", ZD<7> is not needed for the increment output unit 140 of FIG. 5 to generate the flag information CA for each 4-bit group. Besides, since CA<0> is a logic "0" at all times, CA<0> is not needed either. In alternative embodiments of the present invention CA<0> is used and/or ZD<7> is used.

In other words, the flag information generation unit 120, shown in FIGS. 1, 3A, and 3B, outputs flag information CA for each 4-bit group by generating the first logic state for the first group with the second logic state, starting from the LSB of the first logic state inclusion information for each 4-bit group, and for the following lower order groups, and generating the second logic state for higher order groups preceding the first group with the second logic state.

Figure 4A:
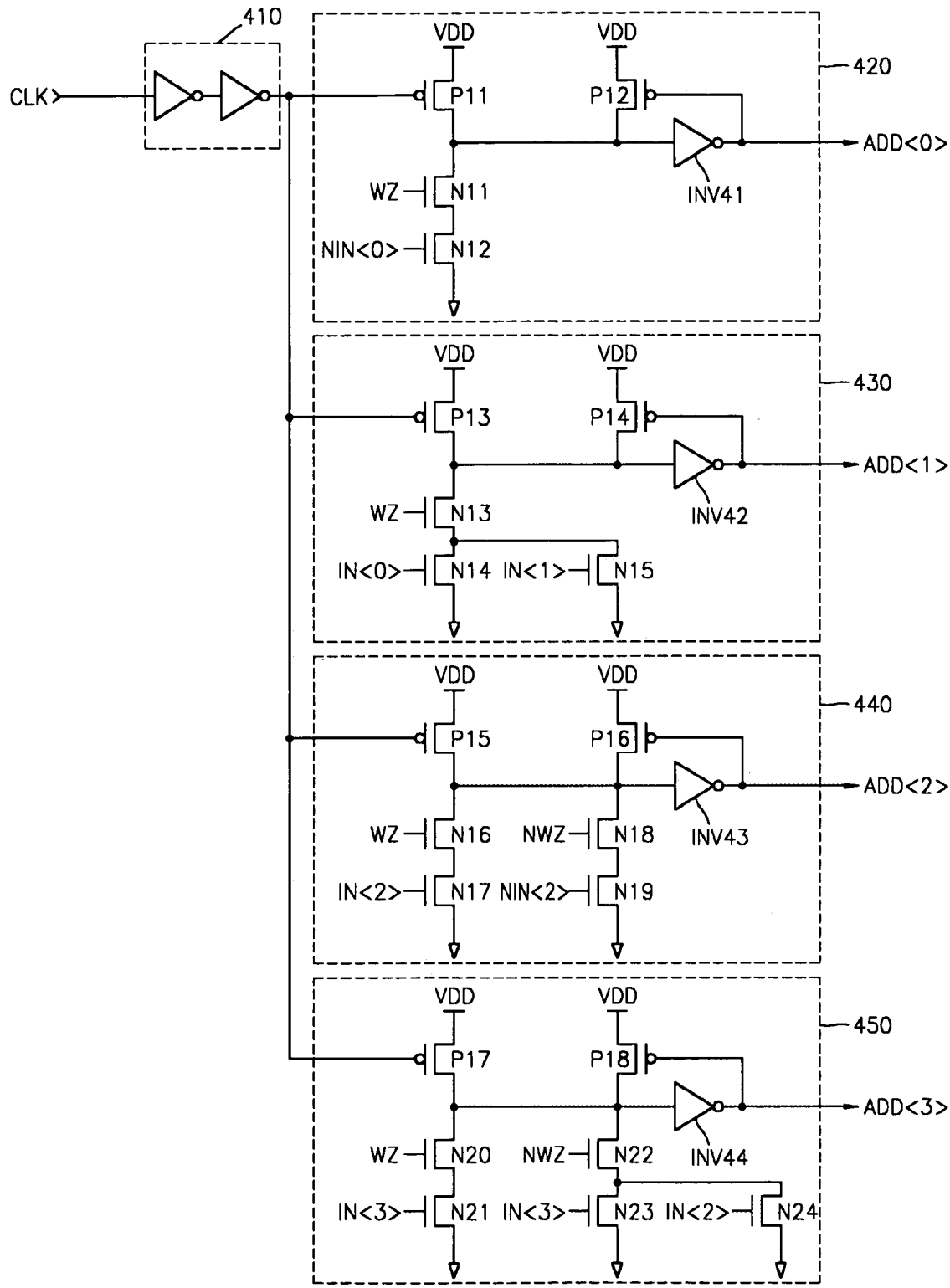
FIGS. 4A and 4B are detailed circuit diagrams of a 4-bit increment unit of FIG. 1 in an exemplary embodiment of the present invention.
Figure 4B:
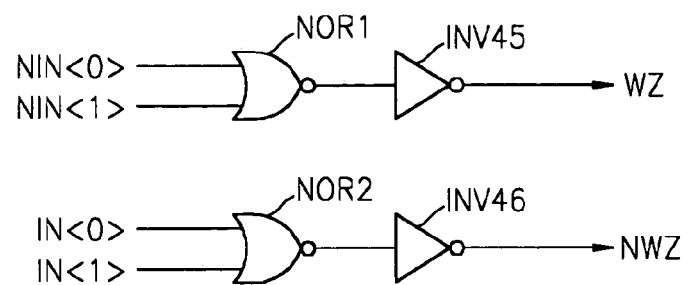

FIGS. 4A and 4B are detailed circuit diagrams of the 4-bit increment unit 130 of FIG.1 in an exemplary embodiment of the present invention.

Referring to FIGS. 4A and 4B, the 4-bit increment unit 130 of FIG. 1 includes increment circuits 420 through 450 for 4 bits. When the clock signal CLK input through a clock buffer 410 is inactivated, i.e., the first logic state, each paired PMOSFET and input of an inverter e.g., an inverter INV41 and a PMOSFET P12, are precharged to the precharging voltage VDD by a circuit, e.g., PMOSFET P11. The paired inverters and PMOSFETs function as output buffers. Each inverter INV41, INV42, INV43, and INV44 inverts the precharging voltage VDD, and each PMOSFET P12, P14, P16, and P18 supplies the precharging voltage VDD to the input end of a paired inverter according to the output of the paired inverter. The output of the paired inverter is converted into the second logic state when the clock signal CLK is activated, i.e., the second logic state, and NMOSFETs N11, N12, N13, N14, N16, N17, N20, and N21, connected in series between the PMOSFET (and the input end of the paired inverter) and a ground voltage, are activated. IN<0> through IN<3> represent 4-bit signals belonging to one 4-bit group of eight 4-bit groups of the 32-bit operand IN. NIN<0> through NIN<2> represent inverted signals of IN<0> through IN<3>. Each 4-bit group can use the 4-bit increment unit 130 of FIGS. 4A and 4B.

The 4-bit increment unit 130 of FIGS. 4A and 4B receives the operand IN and performs an increment on each 4-bit group in accordance with Boolean logic expressions 1 and 2. Boolean logic expression 1 allows the 4-bit increment unit 130 to determine whether 2 bits of each 4-bit group, starting from the LSB, include a logic "0" and defines the increment value ADD for each bit of each 4-bit group based on the result of the determination. Boolean logic expression 2 defines a method of obtaining the increment value ADD and expresses an inverted value using "~".

For example, if 2 bits of a 4-bit group, starting from the LSB, include a logic "0", the 4-bit increment unit 130 outputs the higher order 2 bits of the increment value ADD as the higher order 2 bits of the 4-bit group and outputs the lower order 2 bits of the increment value ADD as the newly defined increment value in accordance with Boolean logic expression 2. If 2 bits of a 4-bit group, starting from the LSB, do not include a logic "0", the 4-bit increment unit 130 outputs the higher order 2 bits of the increment value ADD as the newly defined increment value in accordance with Boolean logic expression 2 and outputs the lower order 2 bits of the increment value ADD as "00".

FIG. 5 is a detailed circuit diagram of the increment output unit 140 of FIG. 1 in an exemplary embodiment of the present invention.

Referring to FIG. 5, when the clock signal CLK input through an output buffer 510 is inactivated, i.e., the first logic state, PMOSFET P52 and an input end of an inverter INV51 are precharged to the precharging voltage VDD by a circuit, e.g., PMOSFET P51. The inverter INV51 and the PMOSFET P52 function as output buffers. The inverter INV51 inverts the precharging voltage VDD. The PMOSFET P52 supplies the precharging voltage VDD to the input end of the inverter INV51 in response to the output of the inverter INV51. The output of the inverter INV51 is inverted to the second logic state when the clock signal CLK is activated, i.e., the second logic state, and NMOSFETs N51 through N54, connected in series between the PMOSFET P52 (and the input end of the inverter INV51) and the ground voltage, are activated. NCA represents an inverting signal of the flag information CA. The increment output unit 140 of FIGS. 1 and 5 can be used for each bit of the 32-bit operand IN. NCA, CA, and ZD can be composed of 4 bits, respectively. IN and ADD correspond with each other for each bit and are each composed of 32 bits.

More specifically, the increment output unit 140 of FIGS. 1 and 5 perform a logic combination on the operand IN, the first logic state inclusion information ZD for each 4-bit group, the flag information CA for each 4-bit group, and the increment value ADD for each 4-bit group, and outputs the whole increment value IO for each 4-bit group as 4 bits of the first logic states ("0000" of Boolean expression 3) for each 4-bit group, 4 bits of the operand IN ("IN" of Boolean expression 3) for each 4-bit group, or 4 bits of the increment value ADD ("IN+1" of Boolean expression 3) for each 4-bit group.

According to the incrementer of an exemplary embodiment of the present invention, the 4-bit zero detection unit 110 groups every 4 bits of the 32-bit operand IN, starting from the LSB, and determines whether each 4-bit group includes the first logic state. If a 4-bit group includes the first logic state, the 4-bit zero detection unit 110 outputs the second logic state as the first logic state inclusion information ZD for the 4-bit group. If a 4-bit group does not include the first logic state, the 4-bit zero detection unit 110 outputs the first logic state as the first logic state inclusion information ZD for each 4-bit group. The flag information generation unit 120 outputs the flag information CA for each 4-bit group by generating the first logic state for the first group with the second logic state, starting from the LSB of the first logic state inclusion information for each 4-bit group, and for the following lower order groups, and generating the second logic state for higher order groups preceding the first group with the second logic state. The 4-bit increment unit 130 receives the operand IN and performs the increment on each 4-bit group in accordance with Boolean expressions 1 and 2. In other words, the 4-bit increment unit 130 performs a logical combination on the operand IN, the first logic state inclusion information ZD for each 4-bit group, the flag information CA for each 4-bit group, and the increment value ADD, in accordance with Boolean expression 3, and outputs the whole increment value IO as 4 bits of the first logic states, 4 bits of the operand IN, or 4 bits of the increment value ADD.

As described above, the incrementer according to exemplary embodiments of the present invention can perform speedy calculations and occupy small areas of a microprocessor chip, using a simple circuit for zero detection and a simple circuit with a MUX structure.

While the present invention has been particularly shown and described with reference to exemplary embodiments thereof, it will be understood by those of ordinary skill in the art that various changes in form and details may be made therein without departing from the spirit and scope of embodiments of the present invention as defined by the following claims and their equivalents.

What is claimed is:

1. An incrementer, comprising:
a 4-bit zero detection unit, wherein said 4-bit detection unit groups every 4 bits of an operand, starting from the least significant bit (LSB), determines whether each 4-bit group includes a first logic state, and outputs a second logic state as first logic state inclusion information for each 4-bit group if the 4-bit group includes the first logic state and outputs the first logic state as first logic state inclusion information for each 4-bit group if the 4-bit group does not include the first logic state;
a flag information generation unit, wherein said flag information generation unit outputs flag information for each 4-bit group by generating the first logic state for the first group with the second logic state, starting from the LSB of the first logic state inclusion information for each 4-bit group, and for the following lower order groups, and by generating the second logic state for higher order groups preceding the first group with the second logic state;
a 4-bit increment unit, wherein said 4-bit increment unit receives the operand and performs an increment on each 4-bit group; and
an increment output unit, wherein said increment output unit performs a logical combination on the operand, the first logic state inclusion information for each 4-bit group, the flag information for each 4-bit group, and an increment value for each 4-bit group, and generates a whole increment value by outputting 4 bits of the first logic state for each 4-bit group, 4 bits of the operand for each 4-bit group, or 4 bits of the increment value for each 4-bit group.

2. The incrementer of claim 1, wherein the increment is performed in accordance with the following Boolean logic expressions, IF IN<0> and IN<1>="1", (IN+1)<3:2>=$IN_C$<3:2>, (IN+1)<1:0>="00", IF IN<0> or IN<1>="0", (IN+1)<3:2>=IN<3:2>, (IN+1)<1:0>=$IN_C$<1:0>, where IN represents the operand, IN+1 represents the increment value, $IN_C$ represents a newly defined increment value, "0" represents the first logic state, and "1" represents the second logic state, and $IN_C$<0>=~IN<0>, $IN_C$<1>=IN<0> OR IN<1>, $IN_C$<2>=~$IN_C$<2>, $IN_C$<3>=IN<2> OR IN<3>, where IN represents the operand and $IN_C$ represents a newly defined increment value.

3. The incrementer of claim 1, wherein the logical combination is performed in accordance with the following Boolean expression, IF ZD="0" and CA="0", IO="0000", IF ZD="1" and CA="0", IO=IN+1, IF CA="1" (ZD="0" or "1"), IO=IN, where ZD represents the first logic state inclusion information for each 4-bit group, CA represents the flag information for each 4-bit group, IO represents the whole increment value for each 4-bit group, IN represents the operand, IN+1 represents the increment value, "0" represents the first logic sate, and "1" represents the second logic state.

4. The incrementer of claim 1, wherein the incrementer operates when the 4-bit zero detection unit, the flag information generation unit, the 4-bit increment unit, and the increment output unit are activated in response to a clock signal.

5. The incrementer of claim 1, wherein, when the clock signal is inactivated, respective input nodes of output buffers of the 4-bit zero detection unit, the flag information generation unit, the 4-bit increment unit, and the increment output unit are precharged to a precharging voltage.

6. The incrementer of claim 5, wherein an inverter for inverting the precharging voltage and a PMOSFET for supplying the precharging voltage to an input end of the inverter in response to an output of the inverter are used as the output buffers.

7. The incrementer of claim 6, wherein the output of the inverter is inverted to a second logic state when the clock signal is activated and a plurality of NMOSFETs, connected in series between the output buffers and a ground voltage, are activated.

8. An increment method of an incrementer, the method comprising:
grouping, in a 4-bit zero detection unit, every 4 bits of an operand, starting from the least significant bit (LSB);
determining, in the 4-bit zero detection unit, whether a first logic state is included in each 4-bit group;
outputting, from the 4-bit zero detection unit, first logic state inclusion information for each 4-bit group as a second logic state if the first logic state is included and as the first logic state if the first logic state is not included;
outputting, from a flag information generation unit, flag information for each 4-bit group by generating the first logic state for a first group with the second logic state, starting from the LSB of the first logic state inclusion information for each 4-bit group, and for following lower order groups, and by generating the second logic state for higher order groups preceding the first group with the second logic state;
incrementing, in a 4-bit increment unit, each 4-bit group;
performing, in an increment output unit, a logical combination on the operand, the first logic state inclusion information for each 4-bit group, the flag information for each 4-bit group, and an increment value for each 4-bit group; and
generating a whole increment value by outputting, from the increment output unit, 4 bits of the first logic state for each 4-bit group, 4 bits of the operand for each 4-bit group, or 4 bits of the increment value for each 4-bit group.

9. The method of claim 8, wherein incrementing each 4-bit group is performed in accordance with the following Boolean logic expressions, IF IN<0> and IN<1>="1", $(IN+1)<3:2> = IN_C<3:2>$, $(IN+1)<1:0> = \text{"00"}$, IF IN<0> or IN<1> = "0", $(IN+1)<3:2> = IN<3:2>$, $(IN+1)<1:0> = IN_C<1:0>$, where IN represents the operand, IN+1 represents the increment value, $IN_C$ represents a newly defined increment value, "0" represents the first logic state, and "1" represents the second logic state, and $IN_C<0> = \sim IN<0>$, $IN_C<1> = IN<0>$ OR $IN<1>$, $IN_C<2> = \sim IN<2>$, $IN_C<3> = IN<2>$ OR $IN<3>$, where IN represents the operand and $IN_C$ represents the newly defined increment value.

10. The method of claim 8, wherein the logical combination is performed in accordance with the following Boolean expression, IF ZD="0" and CA="0", IO="0000", IF ZD="1" and CA="0", IO=IN+1, IF CA="1" (ZD="0" or "1"), IO=IN, where ZD represents the first logic state inclusion information for each 4-bit group, CA represents the flag information for each 4-bit group, IO represents the whole increment value for each 4-bit group, IN represents the operand, IN+1 represents the increment value, "0" represents the first logic sate, and "1" represents the second logic state.

11. The method of claim 8, wherein the incrementer operates when the 4-bit zero detection unit, the flag information generation unit, the 4-bit increment unit, and the increment output unit are activated in response to a clock signal.

12. The method of claim 11, wherein, when the clock signal is inactivated, respective input nodes of output buffers of the 4-bit zero detection unit, the flag information generation unit, the 4-bit increment unit, and the increment output unit are precharged to a precharging voltage.

13. The method of claim 12, wherein an inverter for inverting the precharging voltage and a PMOSFET for supplying the precharging voltage to the input end of the inverter in response to the output of the inverter are used as output buffers.

14. The method of claim 13, wherein the output of the inverter is inverted to the second logic state when the clock signal is activated and a plurality of NMOSFETs, connected in series between the output buffers and a ground voltage, are activated.

15. An incrementer comprising:
a b-bit zero detection unit, wherein b is a number of bits greater than 3, where the b bits of an operand are grouped in an order resulting in b-bit groups, and wherein said b-bit detection unit outputs first logic state inclusion information;
a flag information generation unit, wherein said flag information generation unit outputs flag information for each b-bit group;
a b-bit increment unit, wherein said b-bit increment unit receives the operand and performs an increment on each b-bit group; and
an increment output unit, wherein said increment output unit performs a logical combination and generates a whole increment value by outputting b bits of a first logic state for each b-bit group, b bits of the operand for each b-bit group, or b bits of an increment value for each b-bit group.

16. The incrementer of claim 15, wherein b is 4.

17. The incrementer of claim 15, wherein the b bits of the operand are grouped in an order string, starting from the least significant bit (LSB).

18. The incrementer of claim 17, wherein the b-bit zero detection unit determine whether each b-bit group includes the first logic state, and outputs a second logic state as the first logic state inclusion information for each b-bit group if the b-bit group includes the first logic state and outputs the first logic state as the first logic state inclusion information for each b-bit group if the b-bit group does not include the first logic state.

19. The incrementer of claim 18, wherein the flag information generation unit outputs flag information by generating the first logic state for a first group with the second logic state, starting from the least significant bit (LSB) of the first logic state inclusion information for each b-bit group, and for following lower order groups, and by generating the second logic state for higher order groups preceding the first group with the second logic state.

20. The incrementer of claim 19, wherein the logical combination operates on the operand, the first logic state inclusion information for each b-bit group, the flag information for each b-bit group, and the increment value for each b-bit group.

21. An increment method, comprising:
grouping, in a b-bit zero detection unit, every b-bits of an operand to form b-bit groups;
determining, in the b-bit zero detection unit, whether a first logic state is included in each b-bit group;
outputting, from the b-bit zero detection unit, first logic state inclusion information for each b-bit group;
outputting, from a flag information generation unit, flag information for each b-bit group;
incrementing, in a b-bit increment unit, each b-bit group by an increment value;
performing, in an increment output unit, a logical combination on the operand, the first logic state inclusion information for each b-bit group, the flag information for each b-bit group, and the increment value for each b-bit group; and
generating, in the increment output unit, a whole increment value.

22. The method of claim 21, wherein b is 4.

23. The method of claim 21, wherein grouping starts from the least significant bit (LSB) of the operand.

24. The method of claim 23, wherein outputting first logic state inclusion information comprises:
outputting a second logic state if the first logic state is included in the b-bit group; and
outputting the first logic state if the first logic state is not included in the b-bit group.

25. The method of claim 24, wherein outputting flag information comprises:
generating the first logic state for a first group with the second logic state, starting from the least significant bit (LSB) of the first logic state inclusion information for each b-bit group, and for following lower order groups; and generating the second logic state for higher order groups preceding the first group with the second logic state.

26. The method of claim 25, wherein the whole increment value is generated by outputting b bits of the first logic state for each b-bit group, b bits of the operand for each b-bit group, or b bits of the increment value for each b-bit group.

27. An incrementer, comprising:
a b-bit zero detection means, wherein b is a number of bits greater than 3, wherein said b-bit zero detection means groups every b bits of an operand, starting from the least significant bit (LSB), determines whether each b-bit group includes a first logic state, and outputs a second logic state as first logic state inclusion information for each b-bit group if the b-bit group includes the first logic state and outputs the first logic state as the first logic state inclusion information for each b-bit group if the b-bit group does not include the first logic state;

a flag information generation means, wherein said flag information generation means outputs flag information for each b-bit group by generating the first logic state for a first group with the second logic state, starting from the LSB of the first logic state inclusion information for each b-bit group, and for following lower order groups, and by generating the second logic state for higher order groups preceding the first group with the second logic state;

a b-bit increment means, wherein said b-bit increment means receives the operand and performs an increment on each b-bit group; and an increment output means, wherein said increment output means performs a logical combination on the operand, the first logic state inclusion information for each b-bit group, the flag information for each b-bit group, and an increment value for each b-bit group, and generates a whole increment value by outputting b bits of the first logic state for each b-bit group, b bits of the operand for each b-bit group, or b bits of the increment value for each b-bit group.

28. The incrementer of claim 27, wherein b is 4.

* * * * *